(12) United States Patent
Aridor et al.

(10) Patent No.: US 7,401,203 B2
(45) Date of Patent: Jul. 15, 2008

(54) METHOD FOR WIRING ALLOCATION AND SWITCH CONFIGURATION IN A MULTIPROCESSOR ENVIRONMENT

(75) Inventors: Yariv Aridor, Zichron Ya'akov (IL); Tamar Domany, Kiryat Tivon (IL); Eitan Frachtenberg, Jerusalem (IL); Yoav Gal, Haifa (IL); Edi Shmueli, Haifa (IL); Larry Joseph Stockmeyer, deceased, late of San Jose CA (US); by Robert E. Stockmeyer, legal representative, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 10/940,549

(22) Filed: Sep. 14, 2004

(65) Prior Publication Data
US 2006/0095711 A1    May 4, 2006

(51) Int. Cl.
*G06F 15/00*    (2006.01)
(52) U.S. Cl. .................................................... 712/13
(58) Field of Classification Search .................. 714/4; 709/223, 238, 239; 712/1, 16, 15, 10, 11, 712/28, 13; 326/41; 716/16
See application file for complete search history.

(56) References Cited

U.S. PATENT DOCUMENTS

| | | | | |
|---|---|---|---|---|
| 5,522,046 A | * | 5/1996 | McMillen et al. | 709/239 |
| 5,526,278 A | * | 6/1996 | Powell | 716/16 |
| 5,592,610 A | * | 1/1997 | Chittor | 714/4 |
| 5,596,742 A | * | 1/1997 | Agarwal et al. | 716/16 |
| 5,606,669 A | * | 2/1997 | Bertin et al. | 709/223 |
| 5,729,756 A | * | 3/1998 | Hayashi | 712/15 |
| 5,826,033 A | * | 10/1998 | Hayashi et al. | 709/238 |
| 6,205,532 B1 | * | 3/2001 | Carvey et al. | 712/1 |
| 6,738,891 B2 | * | 5/2004 | Fujii et al. | 712/16 |

OTHER PUBLICATIONS

Ma, E.; Shea, D.G.;E-kernel: an embedding kernel on the IBM victor V256 multiprocessor for program mapping and network reconfiguration; Sep. 1994; IEEE Transactions on Parallel and Distributed Systems, vol. 5, Issue 9, pp. 977-994. □□*

Sangman Moh Chansu Yu Hee Yong Youn Ben Lee Dongsoo Han ; Mapping strategies for switch-based cluster systems of irregulartopology; Jun. 26, 2001-Jun. 29, 2001; Eighth International Conference on Parallel and Distributed Systems, 2001. ICPADS 2001. Proceedings; pp. 733-740.*

* cited by examiner

*Primary Examiner*—Eddie P Chan
*Assistant Examiner*—Jacob Petranek

(57) ABSTRACT

A method for wiring allocation and switch configuration in a multiprocessor computer, the method including employing depth-first tree traversal to determine a plurality of paths among a plurality of processing elements allocated to a job along a plurality of switches and wires in a plurality of D-lines, and selecting one of the paths in accordance with at least one selection criterion.

1 Claim, 17 Drawing Sheets

METHOD FOR WIRING ALLOCATION AND SWITCH CONFIGURATION IN A MULTIPROCESSOR ENVIRONMENT

STATEMENT REGARDING FEDERALLY SPONSORED RESEARCH OR DEVELOPMENT

This invention was made with U.S. government support under Contract No. B517552 awarded by the U.S. Department of Energy. The U.S. Government has certain rights in this invention.

FIELD OF THE INVENTION

The present invention relates to multiprocessor environments in general, and more particularly to the allocation and configuration of elements within multiprocessor environments.

BACKGROUND OF THE INVENTION

Complex computational problems can often be divided and distributed among multiple processing elements, where each processing element may work independently or in conjunction with other processing elements. A multiprocessor computer with flexible resources may group internal resources into one or more partitions, and configure and assign each partition to be responsible for a particular computational task or job.

Communication channels within a multiprocessor are often limited by geometric constraints. For example, processing elements are typically limited in their ability to communicate with other processing elements, and may only be able to communicate with those processing elements physically adjacent to them, such as in a one-dimensional row of processing elements, where each processing element has at most two neighbors with which it may communicate.

Systems that employ multi-port switches and additional network links between switches, such as wires, may provide a multiprocessor computer with more freedom to create partitions of resources that are less constrained by their geometry. What is needed is an efficient mechanism of allocation of resources in a multiprocessor computer to fully utilize this new level of flexibility.

SUMMARY OF THE INVENTION

In another aspect of the present invention a method is provided for wiring allocation and switch configuration in a multiprocessor computer, the method including employing depth-first tree traversal to determine a plurality of paths among a plurality of processing elements allocated to a job along a plurality of switches and wires in a plurality of D-lines, and selecting one of the paths in accordance with at least one selection criterion.

In another aspect of the present invention the employing step includes selecting one of the processing elements as the root of a tree, assigning any of the wires leading from the root processing element to any of the switches, and performing the assigning step a plurality of times until each of the processing elements in the partition is traversed, where the selecting processing element step includes selecting where the processing element fulfills a predefined constraint on the partition of the resources within the multiprocessor computer, and where the selecting path step includes selecting where the path represents a mesh configuration where a plurality of the processing elements are end points in at least one communication sequence.

In another aspect of the present invention the selecting path step includes selecting where the path includes the fewest wires among the plurality of paths.

In another aspect of the present invention any of the steps are performed independently in a plurality of dimensions.

In another aspect of the present invention the selecting path step includes selecting where the path represents a torus configuration.

In another aspect of the present invention any of the steps are performed where any of the processing elements are arranged in isomorphic rows.

In another aspect of the present invention the selecting step includes selecting any of the wires in any of the D-lines independently, such that a similar ordering of the processing elements in each of the D-lines is preserved.

In another aspect of the present invention the selecting step includes selecting any of the wires any of the D-lines independently without regard to the order of the processing elements in the D-lines, and enumerating each of the orderings within any of the D-lines.

In another aspect of the present invention a method is provided for creating a lookup table for allocating wires and configuring switches in a multiprocessor computer, the method including selecting a set of wires in a D-line selected from a plurality of possible sets of wires in the D-line, determining a traversable path through a plurality of switches via the selected set of wires, for each switch that is connected to the set of wires, adding the set of wires to a wireset table including either of a topology indicator and an end-point disposition of the set of wires, selecting a plurality of sets of processing elements in the D-line selected from a plurality of possible sets of processing elements in the D-line, adding the set of processing elements to a table of processing element sets, and associating any entries in the wireset table with any entries in the table of processing element sets where each switch that is connected to a processing element in an entry in the table of processing element sets is connected to a wire in an entry of the wireset table.

In another aspect of the present invention the adding the set of wires step includes, for each switch that is connected to the set of wires if the number of wires connected to the switch is odd marking the switch as 'odd', marking any processing elements that are connected to the switches as 'end-points' in the wireset table, if no switch that is connected to the set of wires has an odd number of wires connected to it adding the set of wires to the wireset table, marking the wireset table entry as 'torus', and if two switches that are connected to the set of wires have an odd number of wires connected to it adding the set of wires to the wireset table, and marking the wireset table entry as 'mesh'.

In another aspect of the present invention the method further includes constructing a single set of lookup tables for each dimension in a particular D-line where the D-lines are isomorphic.

In another aspect of the present invention for searching a lookup table for allocating wires and configuring switches in a multiprocessor computer, the method including finding a set of processing elements allocated to a job in a table of processing element sets, and finding an entry in a wireset table associated with the set, where the entry indicates a path between the processing elements.

In another aspect of the present invention the finding an entry step includes finding where the entry indicates a topology that matches a requested topology, and where the requested topology is a mesh or torus topology.

In another aspect of the present invention the finding an entry step includes finding where the entry indicates a processing element end point that matches a requested end point, where all the wires in the entry are available for each row of processing elements in a partition and each isomorphic row thereto, and where the entry represents a mesh configuration where a plurality of the processing elements are end points in at least one communication sequence.

In another aspect of the present invention the finding an entry step includes finding where the partition is an isomorphic partition.

In another aspect of the present invention the finding processing elements step includes finding where any of the processing elements fulfills a predefined constraint on a partition within the multiprocessor computer.

In another aspect of the present invention the finding an entry step includes finding where the path includes the fewest wires among a plurality of paths.

In another aspect of the present invention any of the steps are performed independently in a plurality of dimensions having a separate wireset table in each dimension.

In another aspect of the present invention any of the steps are performed where any of the processing elements are arranged in isomorphic rows.

In another aspect of the present invention for searching a lookup table for allocating wires and configuring switches among multiple isomorphic rows of processing elements with non-isomorphic wires in a multiprocessor computer, the method including ordering a set of processing elements allocated to a job, and finding an entry in a wireset table associated with the set, where the entry corresponds to a row of the processing elements, where the entry enables the ordering, and where all the wires in the entry are available.

In another aspect of the present invention the finding step includes finding for a plurality of the orderings.

A hybrid search method for allocating wires and configuring switches in a multiprocessor computer, the method including finding an entry in a table of processing element sets corresponding to a set of processing elements allocated to a job, finding an entry in a wireset table associated with the entry in the table of processing element sets, and performing a depth-first tree traversal to determine if a plurality of switches connected to the processing elements and to the wires in the wireset table entry are configurable to satisfy a job request by the multiprocessor computer.

In another aspect of the present invention the steps are performed responsive to a request for a partition with a unique ordering of processing elements, and where the steps are performed to determine if the requested ordering can be satisfied.

In another aspect of the present invention for wiring allocation and switch configuration in a multiprocessor computer, the system including means for traversing operative to determine a plurality of paths among a plurality of processing elements allocated to a job along a plurality of switches and wires in a plurality of D-lines, and means for selecting one of the paths in accordance with at least one selection criterion.

In another aspect of the present invention the means for traversing includes means for selecting one of the processing elements as the root of a tree, means for assigning any of the wires leading from the root processing element to any of the switches, and means for performing the assigning step a plurality of times until each of the processing elements in the partition is traversed, where the means for selecting one of the processing elements includes selecting where the processing element fulfills a predefined constraint on the partition of the resources within the multiprocessor computer, and where the means for selecting one of the paths includes selecting where the path represents a mesh configuration where a plurality of the processing elements are end points in at least one communication sequence.

In another aspect of the present invention the means for selecting one of the paths includes selecting where the path includes the fewest wires among the plurality of paths.

In another aspect of the present invention any of the means are operative independently in a plurality of dimensions.

In another aspect of the present invention the means for selecting one of the paths includes selecting where the path represents a torus configuration.

In another aspect of the present invention any of the means are operative where any of the processing elements are arranged in isomorphic rows.

In another aspect of the present invention the means for selecting one of the paths includes selecting any of the wires in any of the D-lines independently, such that a similar ordering of the processing elements in each of the D-lines is preserved.

In another aspect of the present invention the means for selecting one of the paths includes means for selecting any of the wires any of the D-lines independently without regard to the order of the processing elements in the D-lines, and means for enumerating each of the orderings within any of the D-lines.

In another aspect of the present invention for creating a lookup table for allocating wires and configuring switches in a multiprocessor computer, the system including means for selecting a set of wires in a D-line selected from a plurality of possible sets of wires in the D-line, means for determining a traversable path through a plurality of switches via the selected set of wires, means for adding the set of wires, for each switch that is connected to the set of wires, to a wireset table including either of a topology indicator and an end-point disposition of the set of wires, means for selecting a plurality of sets of processing elements in the D-line selected from a plurality of possible sets of processing elements in the D-line, means for adding the set of processing elements to a table of processing element sets, and means for associating any entries in the wireset table with any entries in the table of processing element sets where each switch that is connected to a processing element in an entry in the table of processing element sets is connected to a wire in an entry of the wireset table.

In another aspect of the present invention the system further includes means for constructing a single set of lookup tables for each dimension in a particular D-line where the D-lines are isomorphic.

In another aspect of the present invention a system is provided for searching a lookup table for allocating wires and configuring switches in a multiprocessor computer, the system including means for finding a set of processing elements allocated to a job in a table of processing element sets, and means for finding an entry in a wireset table associated with the set, where the entry indicates a path between the processing elements.

In another aspect of the present invention the means for finding an entry is operative to find where the entry indicates a topology that matches a requested topology, and where the requested topology is a mesh or torus topology.

In another aspect of the present invention the means for finding an entry is operative to find where the entry indicates a processing element end point that matches a requested end point, where all the wires in the entry are available for each row of processing elements in a partition and each isomorphic row thereto, and where the entry represents a mesh configuration where a plurality of the processing elements are end points in at least one communication sequence.

In another aspect of the present invention the means for finding an entry is operative to find where the partition is an isomorphic partition.

In another aspect of the present invention the means for finding processing elements is operative to find where any of the processing elements fulfills a predefined constraint on a partition within the multiprocessor computer.

In another aspect of the present invention the means for finding an entry is operative to find where the path includes the fewest wires among a plurality of paths.

In another aspect of the present invention any of the means are operative independently in a plurality of dimensions having a separate wireset table in each dimension.

In another aspect of the present invention any of the means are operative where any of the processing elements are arranged in isomorphic rows.

In another aspect of the present invention for searching a lookup table for allocating wires and configuring switches among multiple isomorphic rows of processing elements with non-isomorphic wires in a multiprocessor computer, the system including means for ordering a set of processing elements allocated to a job, and means for finding an entry in a wireset table associated with the set, where the entry corresponds to a row of the processing elements, where the entry enables the ordering, and where all the wires in the entry are available.

In another aspect of the present invention the means for finding is operative to find for a plurality of the orderings.

In another aspect of the present invention a hybrid search system is provided for allocating wires and configuring switches in a multiprocessor computer, the system including means for finding an entry in a table of processing element sets corresponding to a set of processing elements allocated to a job, means for finding an entry in a wireset table associated with the entry in the table of processing element sets, and means for performing a depth-first tree traversal to determine if a plurality of switches connected to the processing elements and to the wires in the wireset table entry are configurable to satisfy a job request by the multiprocessor computer.

In another aspect of the present invention the means are operative responsive to a request for a partition with a unique ordering of processing elements, and where the steps are performed to determine if the requested ordering can be satisfied.

In another aspect of the present invention a computer program is provided embodied on a computer-readable medium, the computer program including a first code segment operative to employ a depth-first tree traversal to determine a plurality of paths among a plurality of processing elements allocated to a job along a plurality of switches and wires in a plurality of D-lines, and a second code segment operative to select one of the paths in accordance with at least one selection criterion.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
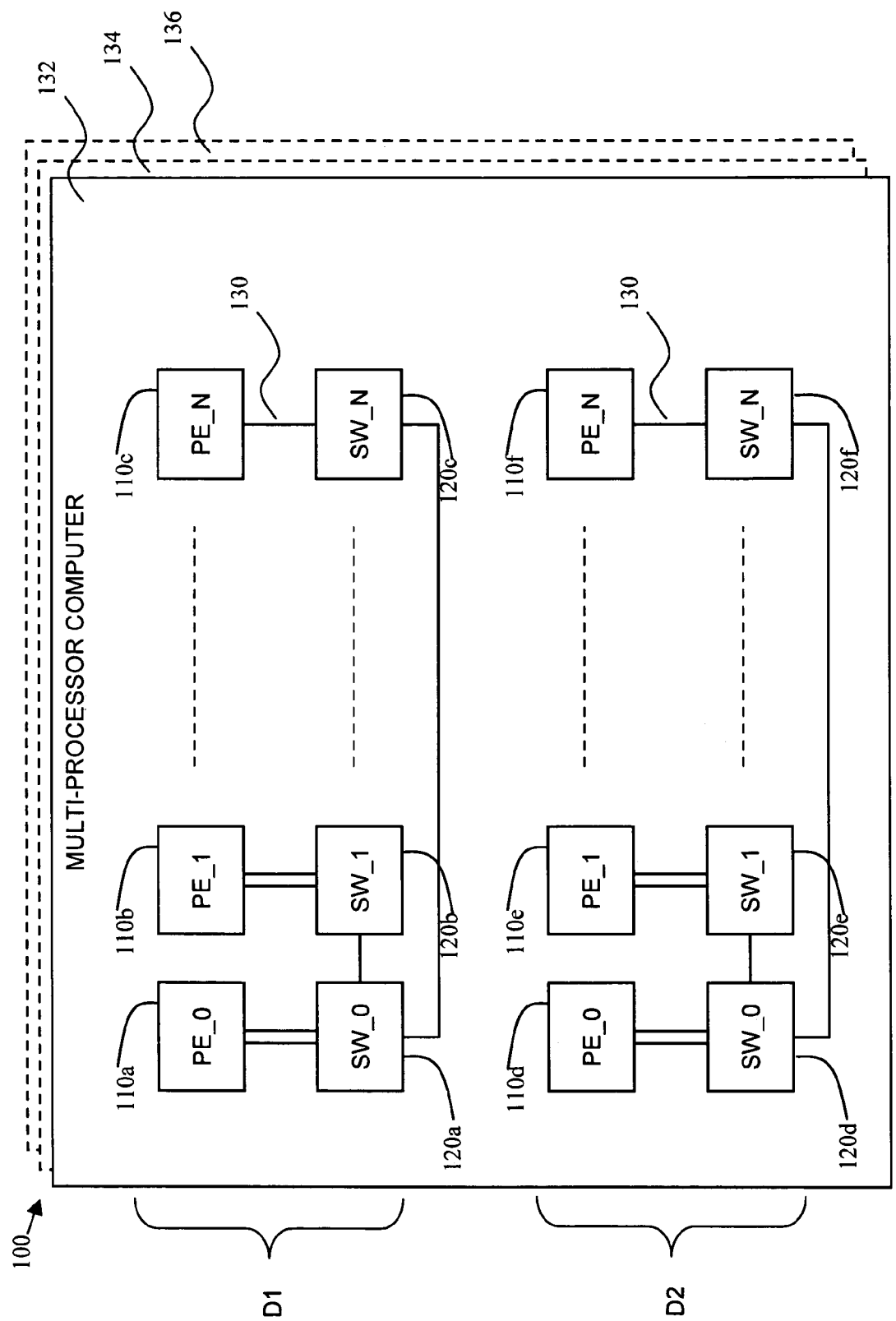
FIG. 1 is a simplified pictorial illustration of a multiprocessor computer, constructed and operative in accordance with a preferred embodiment of the present invention.

Reference is now made to FIG. 1, which is a simplified pictorial illustration of a multiprocessor computer, constructed and operative in accordance with a preferred embodiment of the present invention. A multiprocessor computer 100 is shown having a single, two-dimensional plane 132 of processing elements 110, switches 120, and wires 130, although multiprocessor computer 100 may have additional dimensions as well, such as is shown by planes 134 and 136. While the present invention is described with reference to a two-dimensional plane, the invention is not limited to a two-dimensional arrangement, and may be understood with respect to any multi-dimensional arrangement.

In multiprocessor computer 100, a set of processing elements 110a through 110f, where each processing element 110 may be a single processor or a multiprocessor, and a set of switches 120a through 120f, are shown. Processing elements 110 typically utilize a private memory module to store data and are capable of performing computational tasks, such as add, subtract, and move, on the stored data. Each processing element 110 may be connected to other processing elements 110 through one or more switches 120 via one or more wires 130 connecting each processing element 110 to each switch 120, or through a switch 120 to another, not necessarily adjacent switch 120, such as is shown for processing element 110a that may be connected to processing element 110b through switches 120a and 120b. Thus, a processing element 110 may be connected to more than one switch 120, and a switch 120 may be connected to more than one processing element 110. Where there are multiple dimensions, each dimension typically has its own switches and wires, whereas a processing element may communicate with switches and elements in any dimension.

Typically, the internal connectivity of switch 120, being the communication pathways within the switch, is configurable prior to the assignment of a job by multiprocessor computer 100 to processing element 110. However, once the switch 120 is configured and the job assigned, the configuration of switch 120 is preferably fixed until the conclusion of the job.

Multiprocessor computer 100 may include multiple switches 120 capable of numerous configurations, where during the assignment of resources to a job only a subset of the numerous configurations is typically available for assignment. Multiprocessor computer 100 typically first selects a set of processing elements 110 that are suited to the job, and then preferably employs an algorithm, such as is described hereinbelow, to configure switches 120 to serve processing elements 110 for one or more jobs.

Two typical configurations of switches 120 that may be employed are the 'torus' and 'mesh' configurations. In a 'torus' configuration, processing elements 110 may communicate with each other in a bi-directional or circular fashion, where the first processing element is also the last processing element in a communication sequence. In a 'mesh' configuration, processing elements 110 are connected such that certain processing elements 110 are at the end of one or more communication paths, and are called 'end-points'. For example, a mesh may include two 'end-points' in a one dimensional array of processing elements 110.

Processing elements 110 are typically arranged in isomorphic rows called D-lines, such as the rows labeled D1 and D2 in FIG. 1. The term "isomorphic" as used herein refers to sets of resources, such as processing elements, switches, wires, etc., that may be logically configured to behave in a like manner, although they are not necessarily identical in number or order or in the way in which they are connected. For example, although two D-lines may not be identical, they are isomorphic if they may be configured to preserve the order in which processing elements communicate with each other, such as where PE_0 communicates through PE_1 to PE_2 in both D-lines even if their physical set of wires are non-identical. Similarly, two non-identical sets of wires, where each set of wires interconnects a corresponding set of processing elements and switches, are isomorphic if each set of wires provides an interconnection path that allows the processing elements to communicate with the switches in a functionally similar fashion. When multiprocessor computer 100 selects a set of processing elements 110 in a first D-line for a job, it preferably selects an isomorphic set of processing elements in a second D-line as well. The second isomorphic D-line may be situated anywhere in multiprocessor computer 100, and need not be adjacent to the first D-line. For example, if multiprocessor computer 100 were to select processing elements PE_0 and PE_1 in D1, it preferably selects the isomorphic set PE_0 and PE_1 in D2 as well. In an isomorphic partition, multiple sets of processing elements, switches, and wires are selected from multiple isomorphic D-lines, where each set is logically configured to behave in a like manner.

A general tree-search based method for wiring allocation and switch configuration is described in detail hereinbelow with reference to FIGS. 2A-2C. Where the processing elements in each D-line are similarly ordered, the tree-search based method described in detail hereinbelow with reference to FIG. 2D may be employed. Where the processing elements in each D-line need not be similarly ordered, the tree-search based method described in detail hereinbelow with reference to FIG. 2E may be employed.

As an alternative to the tree-search based methods of FIGS. 2A-2E, look-up table methods in detail hereinbelow with reference to FIGS. 4-6 may be employed. Where multiprocessor computer 100 selects isomorphic PEs and wires for a partition from sets of isomorphic D-lines, the selection of the switches 120 and the configuration of their associated wires 130 may performed as is described in detail hereinbelow with reference to FIG. 4. Where multiprocessor computer 100 selects isomorphic PEs and non-isomorphic sets of switches and wires for a partition from multiple isomorphic D-lines, multiprocessor computer 100 preferably employs a configuration methodology such as is described hereinbelow with reference to FIGS. 5 and 6, which represent alternative methodologies.

Multiprocessor computer 100 preferably retains an availability list (not shown) that indicates the availability of resources. The availability list may be used when selecting and configuring resources as described hereinbelow with reference to FIGS. 4, 5, and 6. For example, any wires 130 that are broken, and therefore unable to function as communication pathways, are preferably marked as "unavailable" in the availability list. The availability list may be constructed employing any known technique, such as a periodic testing of resources.

Figure 2A:
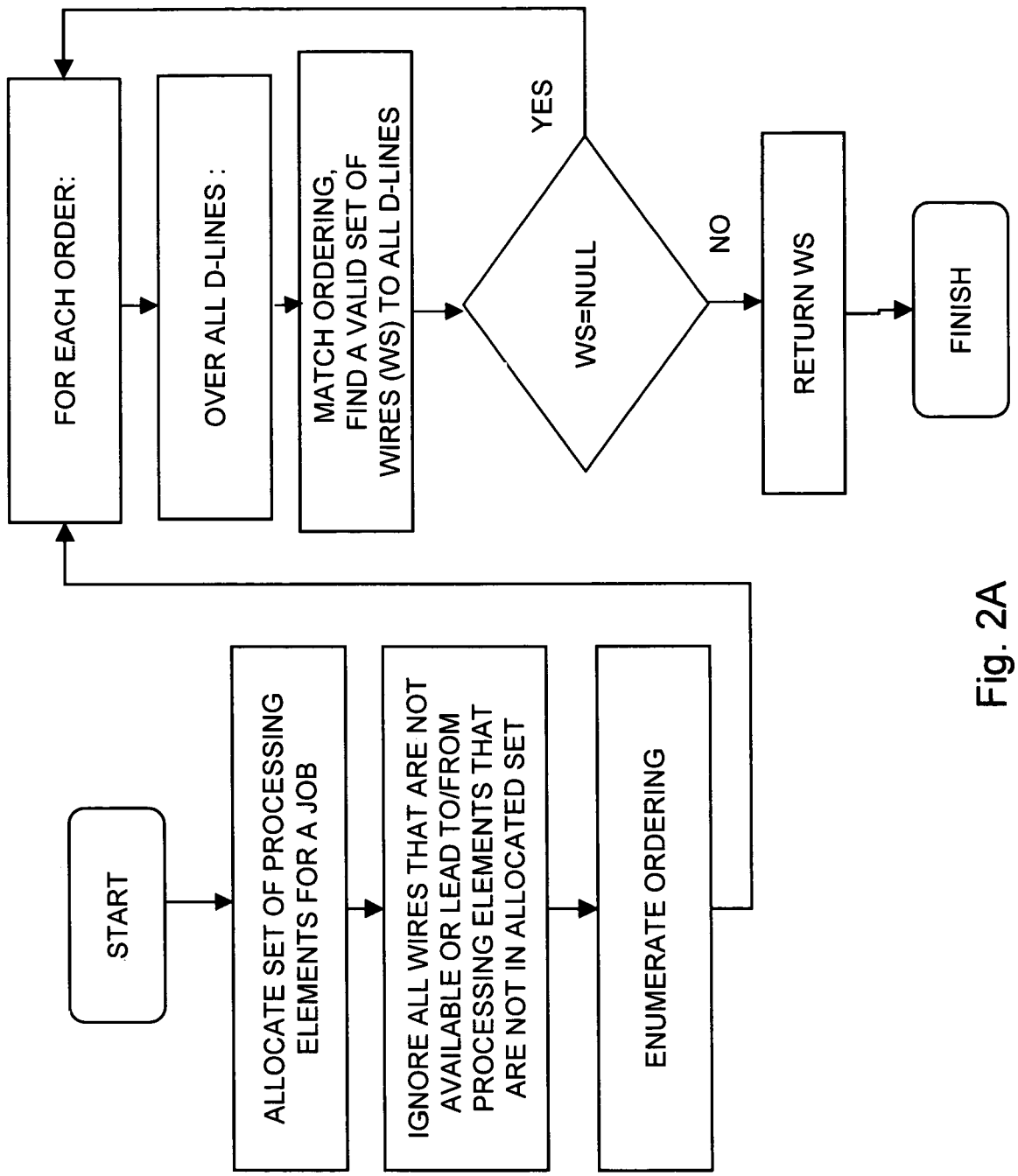
FIG. 2A is a simplified flow chart illustration of a general, tree-search based method for wiring allocation and switch configuration, operative in accordance with a preferred embodiment of the present invention.
Figure 2B:
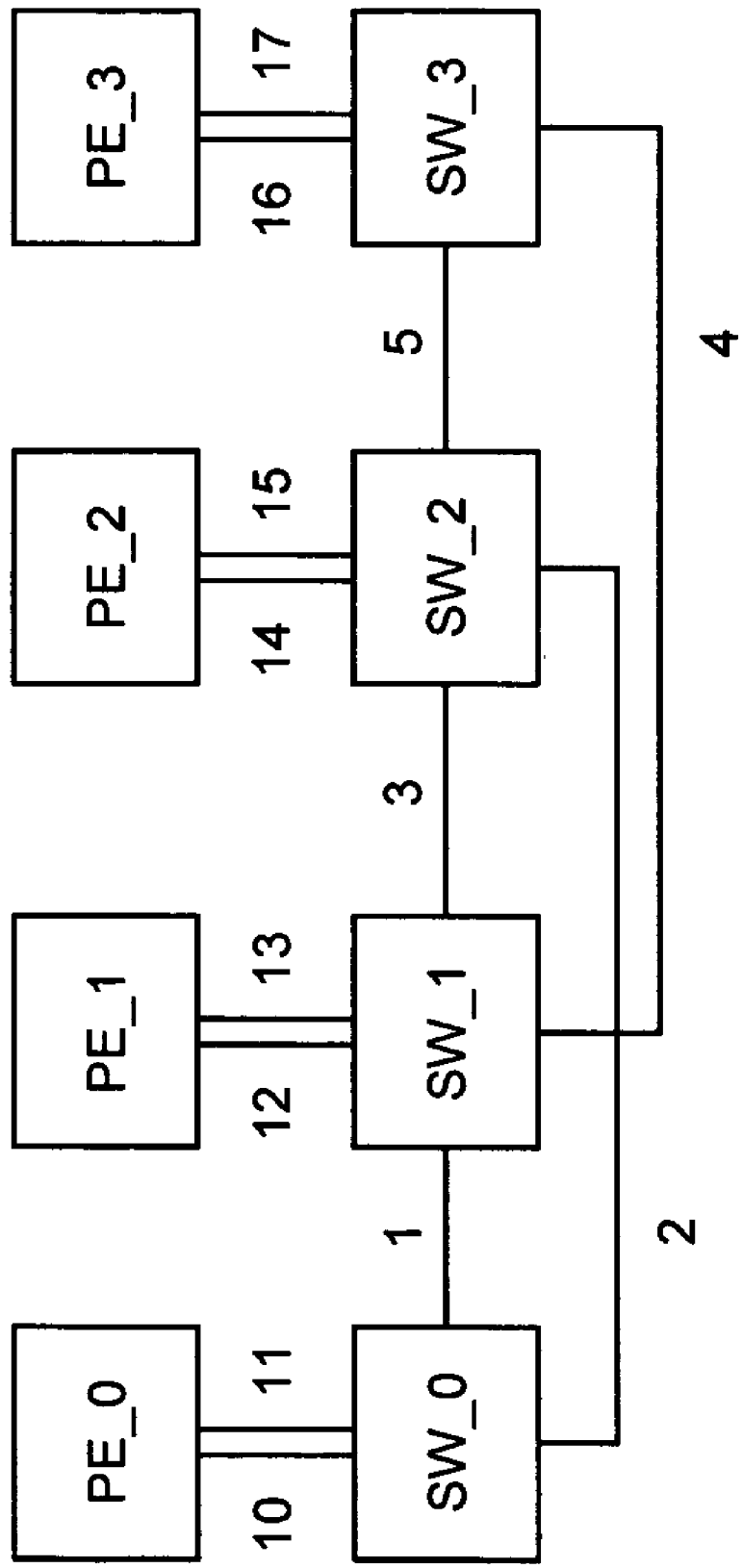
FIG. 2B is a simplified block diagram of an exemplary configuration of switches, constructed and operative in accordance with a preferred embodiment of the present invention.
Figure 2C:
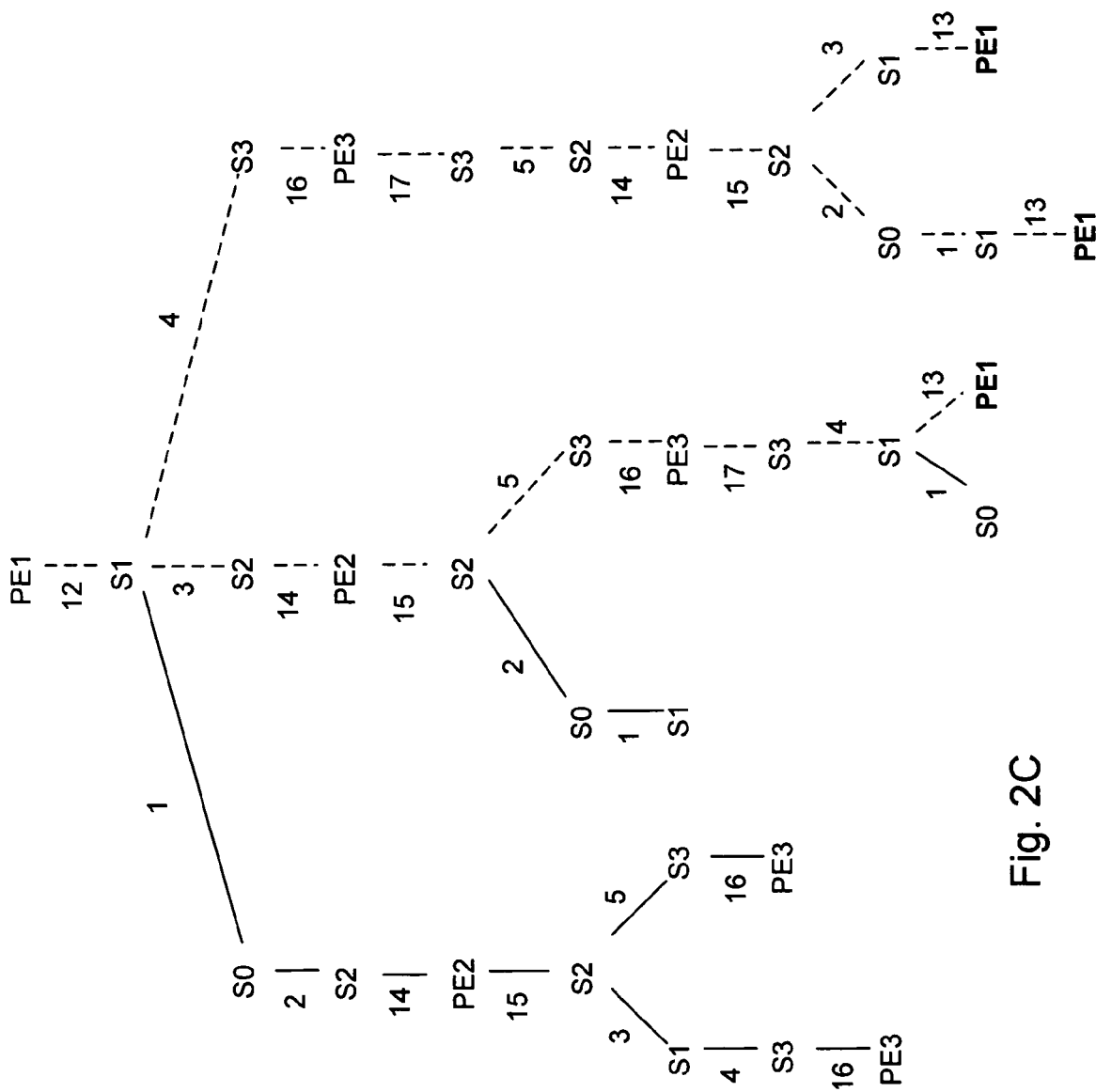
FIG. 2C is a simplified diagram illustration of a switch configuration tree, operative in accordance with a preferred embodiment of the present invention.

Reference is now made to FIG. 2A, which is a simplified flow chart illustration of a method for wiring allocation and switch configuration, operative in accordance with a preferred embodiment of the present invention, FIG. 2B, which is a simplified block diagram of an exemplary configuration of switches, constructed and operative in accordance with a preferred embodiment of the present invention, and FIG. 2C, which is a simplified diagram illustration of a switch configuration tree, operative in accordance with a preferred embodiment of the present invention.

In the method of FIG. 2A multiprocessor computer 100 creates a partition by allocating a set of processing elements 110 to a job and then attempting to allocate wires 130 and configure switches 120 to enable the allocated processing elements 110 to function in accordance with predefined criteria, such as to maximize the utilization of multiprocessor computer 100 by taking into account current and future job requests. A depth-first tree traversal algorithm well known in the art may be used to determine paths among processing elements 110 and switches 120 as follows. A first processing element 110 is preferably chosen as the root of the tree, typically to fulfill the constraints on the partition of the resources within multiprocessor computer 100. For example, should the partition require that a particular processing element 110 be an end-point, that processing element 110 may be chosen as the root. Next, a wire 130 leading from the root processing element 110 to a switch 120 is assigned. A wire connecting the switch 120 to either another switch 120 or another processing element 110 is then assigned, and so on between processing elements 110 and switches 120 until all the processing elements 110 in the allocated partition are traversed.

In the configuration of FIG. 2B, the multiprocessor computer 100 includes four processing elements labeled PE_0, PE_1, PE_2, and PE_3, that are each directly connected by two wires to switches labeled SW_0, SW_1, SW_2, and SW_3, respectively. For example, PE_1 is connected through wire 12 and wire 13 to SW_1. The switches 120 are preferably additionally connected to other switches, such as where SW_1 is connected to SW_0 over wire 1, to SW_2 over wire 3, and to SW_3 over wire 4.

In the method of FIG. 2A, the results of which are shown in the tree of FIG. 2C, multiprocessor computer 100 attempts to allocate PE_1, PE_2, and PE_3 to a job in a torus configuration. To accomplish this, the set of wires and switches that connect the processing elements 110 to each other is determined. Following the depth-first tree traversal algorithm, multiprocessor computer 100 constructs the decision tree depicted in FIG. 2C and determines that there are three eligible configurations, shown in dashed lines, of wires and switches that connect processing elements 110 to each other in a torus, where two of the configurations use the same switch-to-switch set of wires. {3,5,4}.

Where multiple eligible orderings are found, a specific criteria is preferably set to choose between the options, such as by choosing the ordering which utilizes fewer wires. Should the orderings utilize the same number of wires, the first ordering found by the search methodology may be chosen.

Alternatively, a recursive algorithm may be used to construct the tree described in FIG. 2C as follows:

```
Enumerate_orderings (pos, PEinD, ord){
  // Input:
  // pos - current switch or PE, initially root
  // PEinD - A vector of PE indices to order
  // ord - a partial ordering accumulated so far, initially null
    If PEinD is empty then {          // Recursion end:
        Save (ord) and return   // Completed ordering
    }
    Loop on valid exit wires w from pos to new_pos {
        Disable (w)
        If new_pos is PE {
            Append (ord, new_pos)
            Remove (PEinD, new_pos)
        }
        Enumerate_orderings (new_pos, PEinD, ord)
        If new_pos is PE {
            Remove (ord, new_pos)
            Append (PEinD, new_pos)
        }
    }
```

The recursive algorithm may be implemented by employing heap memory on multiprocessor computer 100 as opposed to the operating system's stack memory. This methodology may further have the advantage of reusing trees constructed in one search for other searches.

Figure 2D:
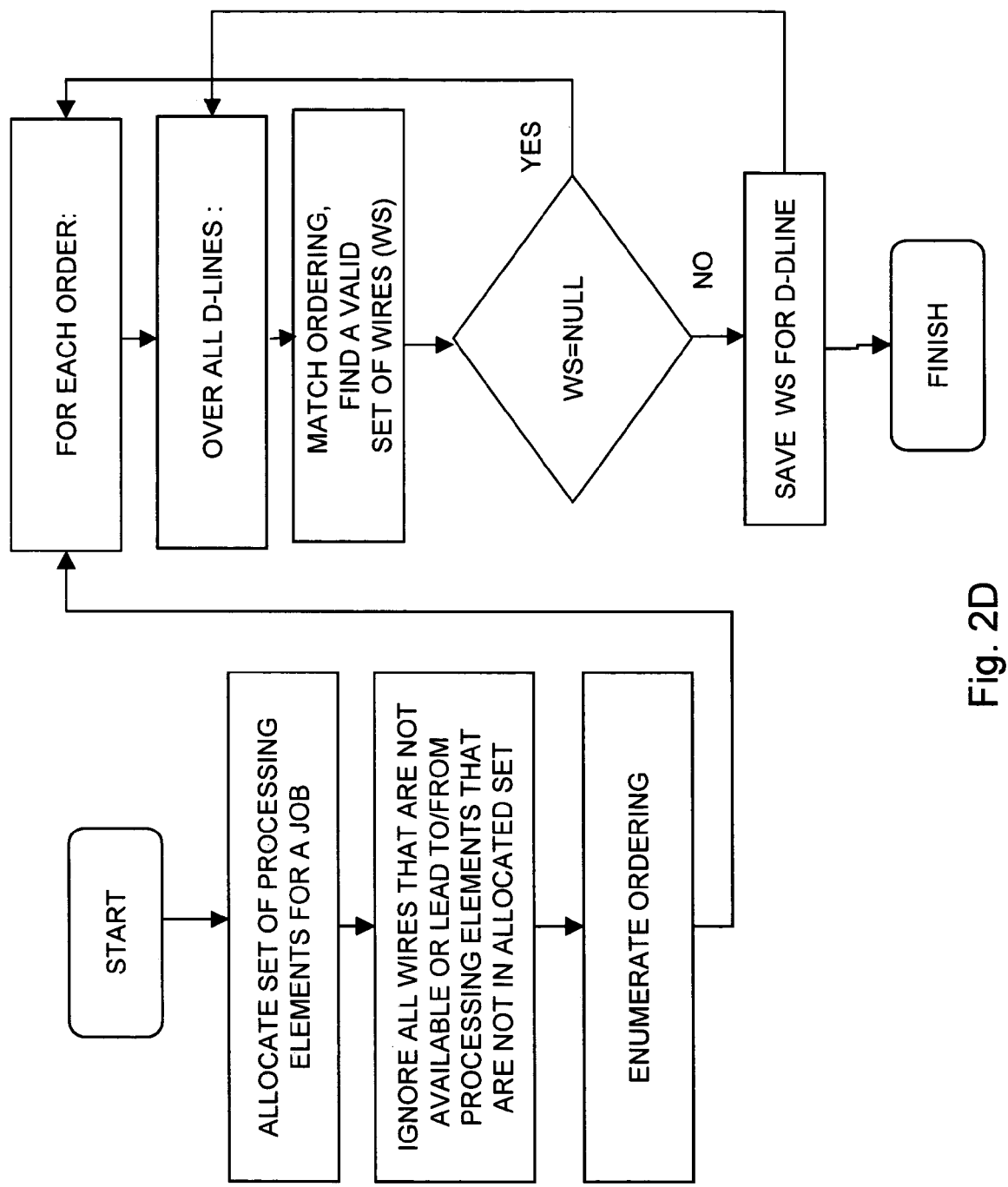
FIG. 2D is a simplified flow chart illustration of a general, tree-search based method for wiring allocation and switch configuration with isomorphic processing elements and non-isomorphic wires, where the processing elements in each D-line are similarly ordered, operative in accordance with a preferred embodiment of the present invention.

Reference is now made to FIG. 2D, which is a simplified flow chart illustration of a method for wiring allocation and switch configuration with isomorphic processing elements and non-isomorphic wires, where the processing elements in each D-line are similarly ordered, operative in accordance with a preferred embodiment of the present invention. The method of FIG. 2D is substantially similar to the method of FIG. 2A with the notable exception that wires 130 are selected by multi-processing computer 100 for each D-line independently, which preferably preserves the similar ordering of processing elements 110.

Figure 2E:
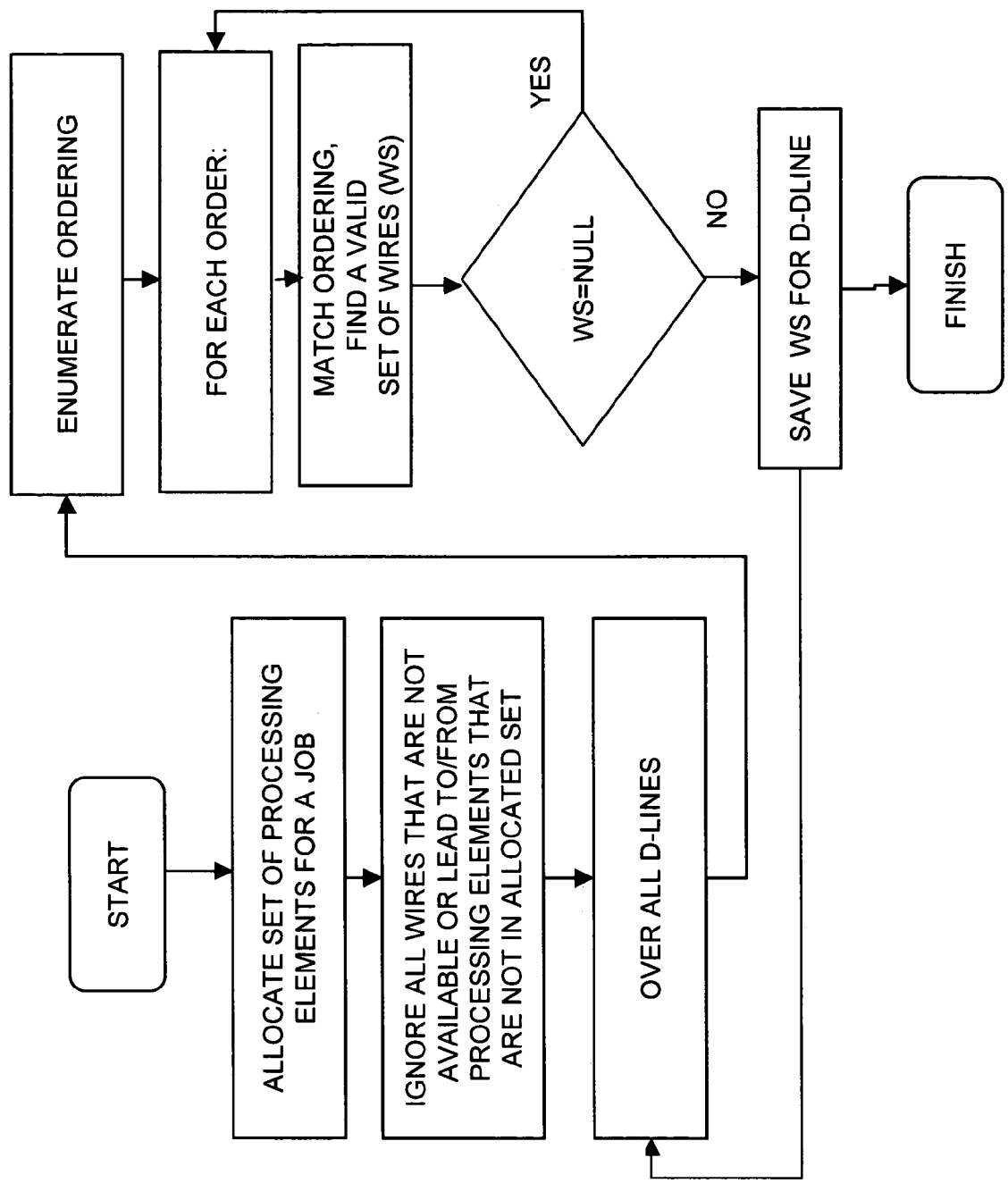
FIG. 2E is a simplified flow chart illustration of a method for wiring allocation and switch configuration with isomorphic processing elements and non-isomorphic wires, where the processing elements in each D-line need not be similarly ordered, operative in accordance with a preferred embodiment of the present invention.

Reference is now made to FIG. 2E, which is a simplified flow chart illustration of a method for wiring allocation and switch configuration with isomorphic processing elements and non-isomorphic wires, where the processing elements in each D-line need not be similarly ordered, operative in accordance with a preferred embodiment of the present invention. The method of FIG. 2E is substantially similar to the method of FIG. 2A with the notable exception that wires 130 are selected by multi-processing computer 100 for each D-line independently, without regard to the order of processing elements 110, and an enumeration of each of the orderings within a D-line is calculated and the matching process is performed as described in FIG. 2A. For example, a multi-processor computer with multiple D-lines that contain isomorphic processing elements 110 may be restricted by its choice of processing elements 110, yet be unrestricted with regard to the ordering of the processing elements 110. Thus, the multi-processor computer may choose PE_1, PE_2 and PE_3, shown in FIG. 2B, from a first D-line utilizing wires 3 and 5, shown in FIG. 2B, to connect them in the order [PE_1, PE_2, PE_3]. However, due to an external constraint, such as a malfunction in a wire, e.g. wire 3, of a second D-line, multi-processor computer 100 may utilize wires 4 and 5 and connect the processing elements 110 in the order [PE_1, PE_3, PE_2]. In this manner, multi-processor computer may fulfill its requirement to select isomorphic processing elements 110 within the limits of its restrictions.

In the methods of FIGS. 2A-2E, multi-processor computer 100 may limit its search of possible orderings and may cease construction of the switch configuration tree upon finding any one of potentially many orderings that fulfill its mandate.

As an alternative to employing the method of FIG. 2A which uses a switch configuration tree to determine wiring allocation and switch configuration, any of the alternative methods described hereinbelow with reference to FIGS. 4, 5, and 6 may be employed. In each of the alternative methods of FIGS. 4, 5, and 6, lookup tables are used to determine wiring allocation and switch configuration. A method for creating such lookup tables is described hereinbelow with reference to FIGS. 3A, 3B, 3C and 3D.

Figure 3A:
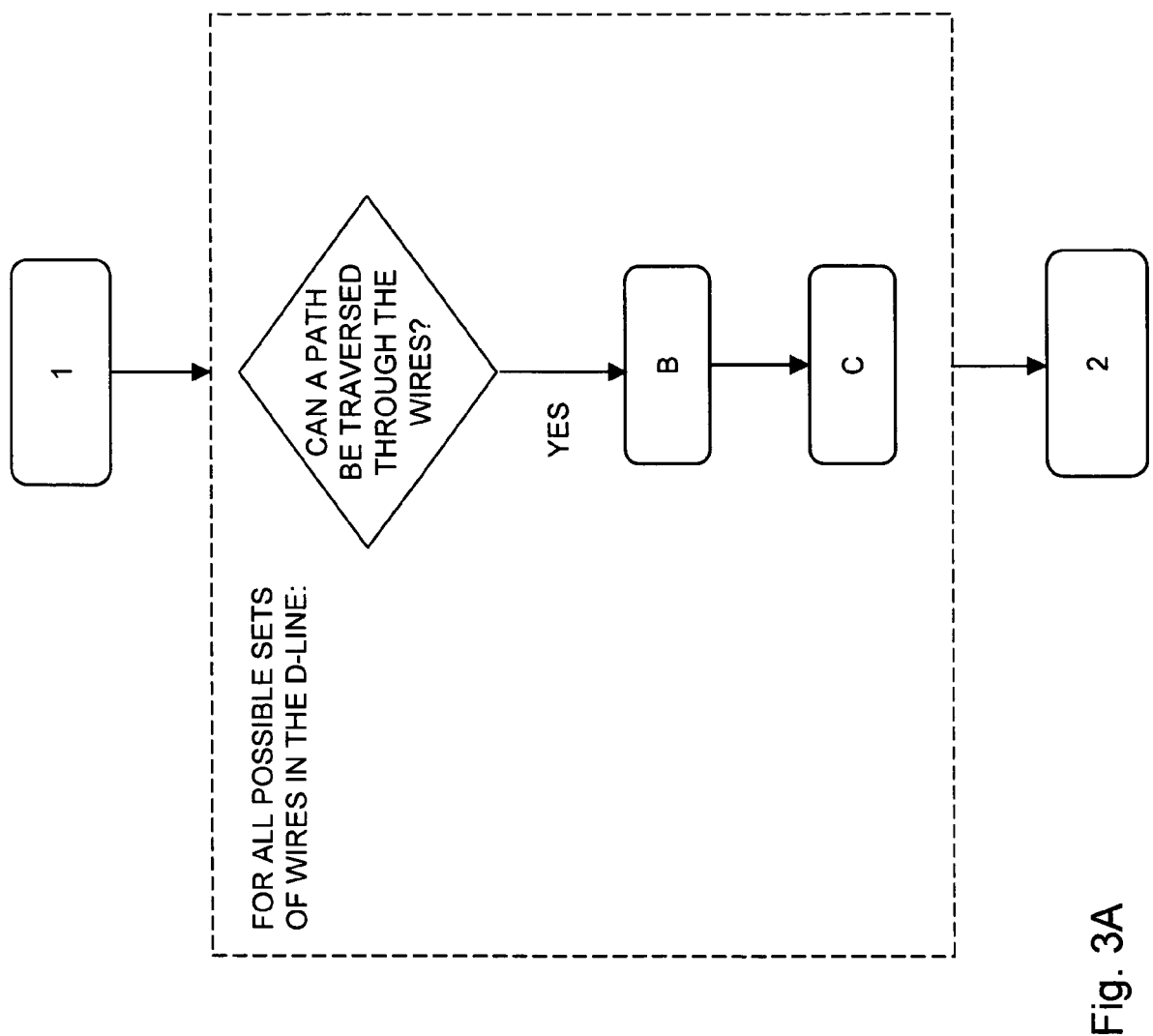
FIGS. 3A, 3B, 3C and 3D, taken together, is a simplified flow chart illustration of a method for creating a lookup table for allocating wires and configuring switches, operative in accordance with a preferred embodiment of the present invention.
Figure 3B:
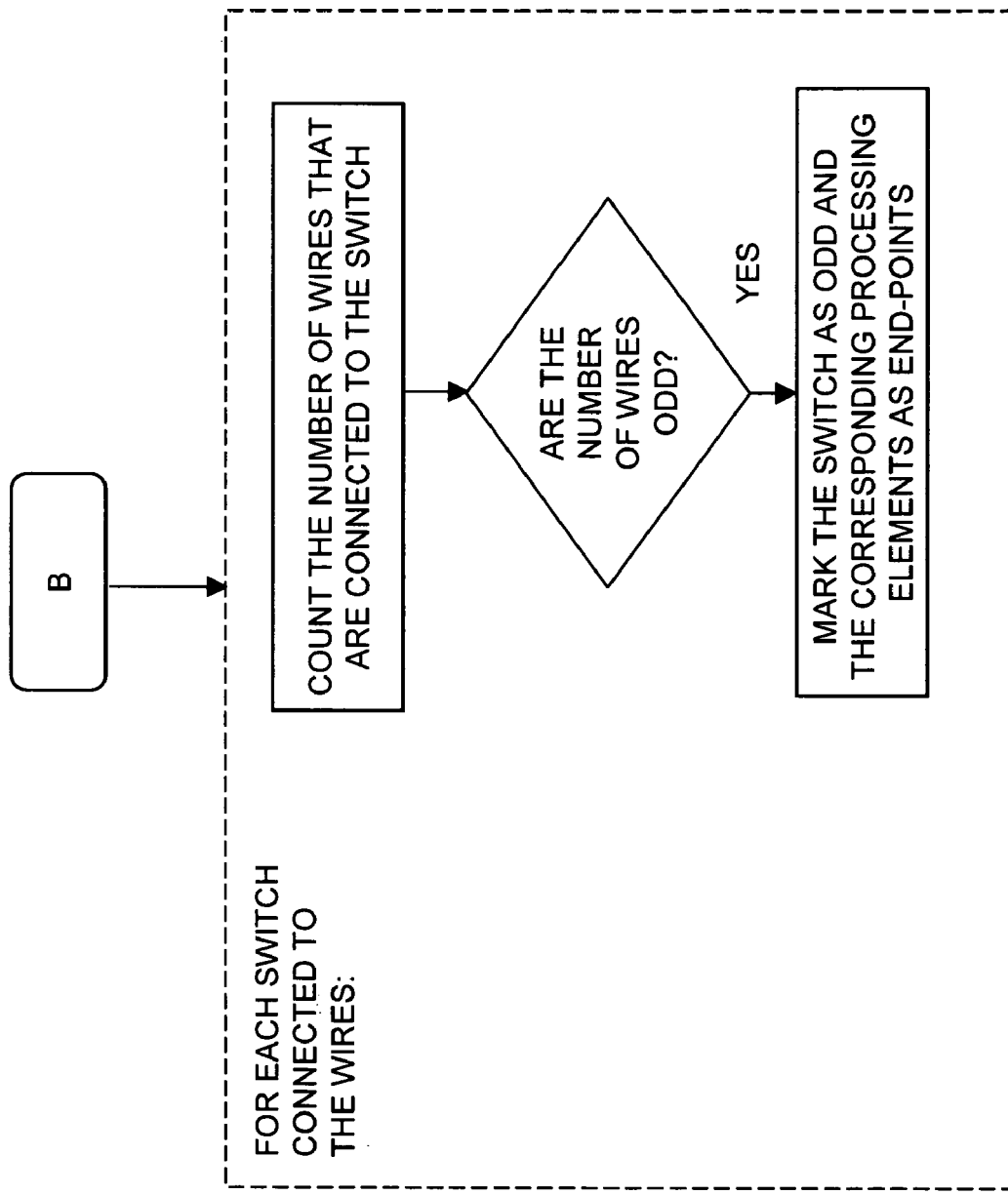
Figure 3C:
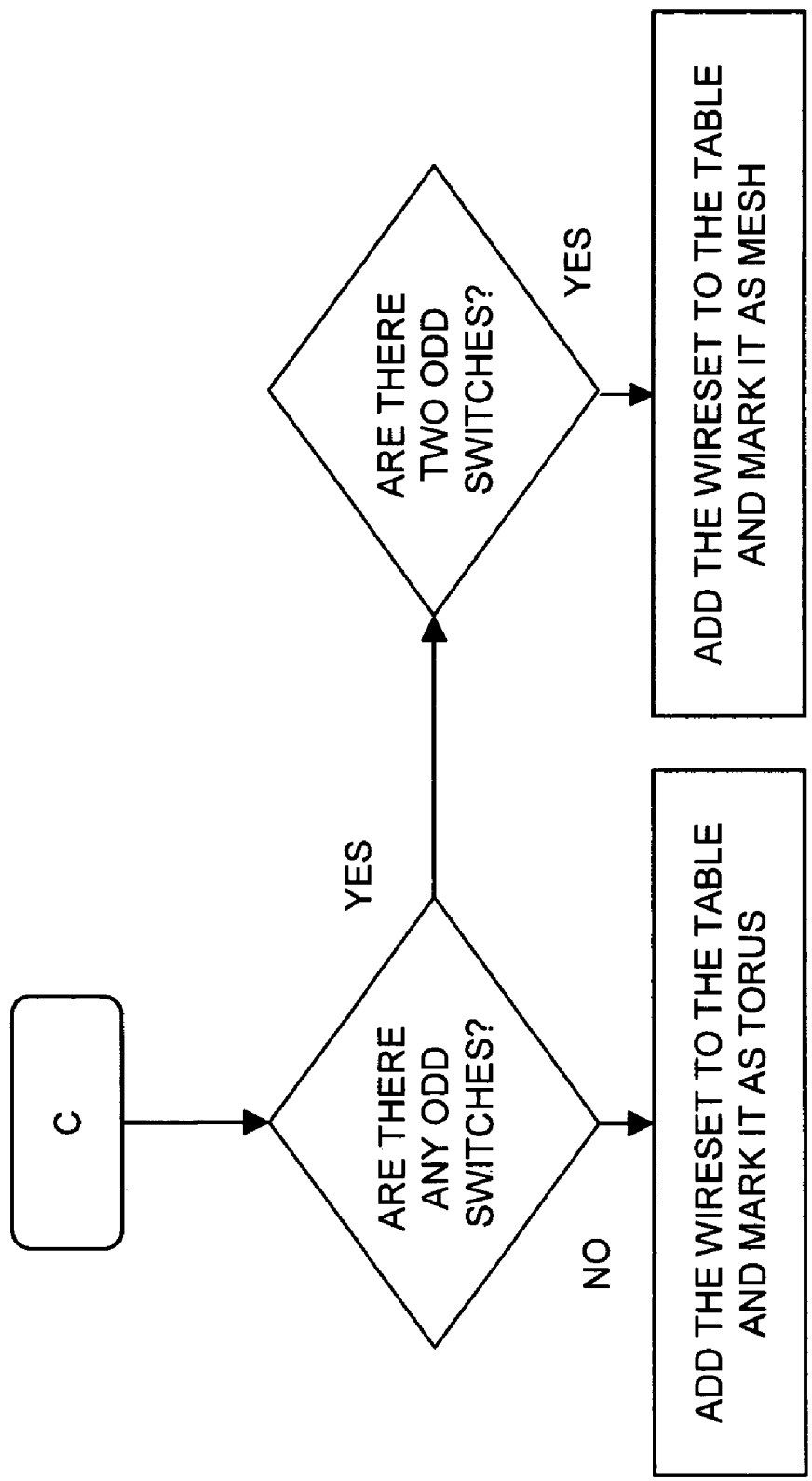
Figure 3D:
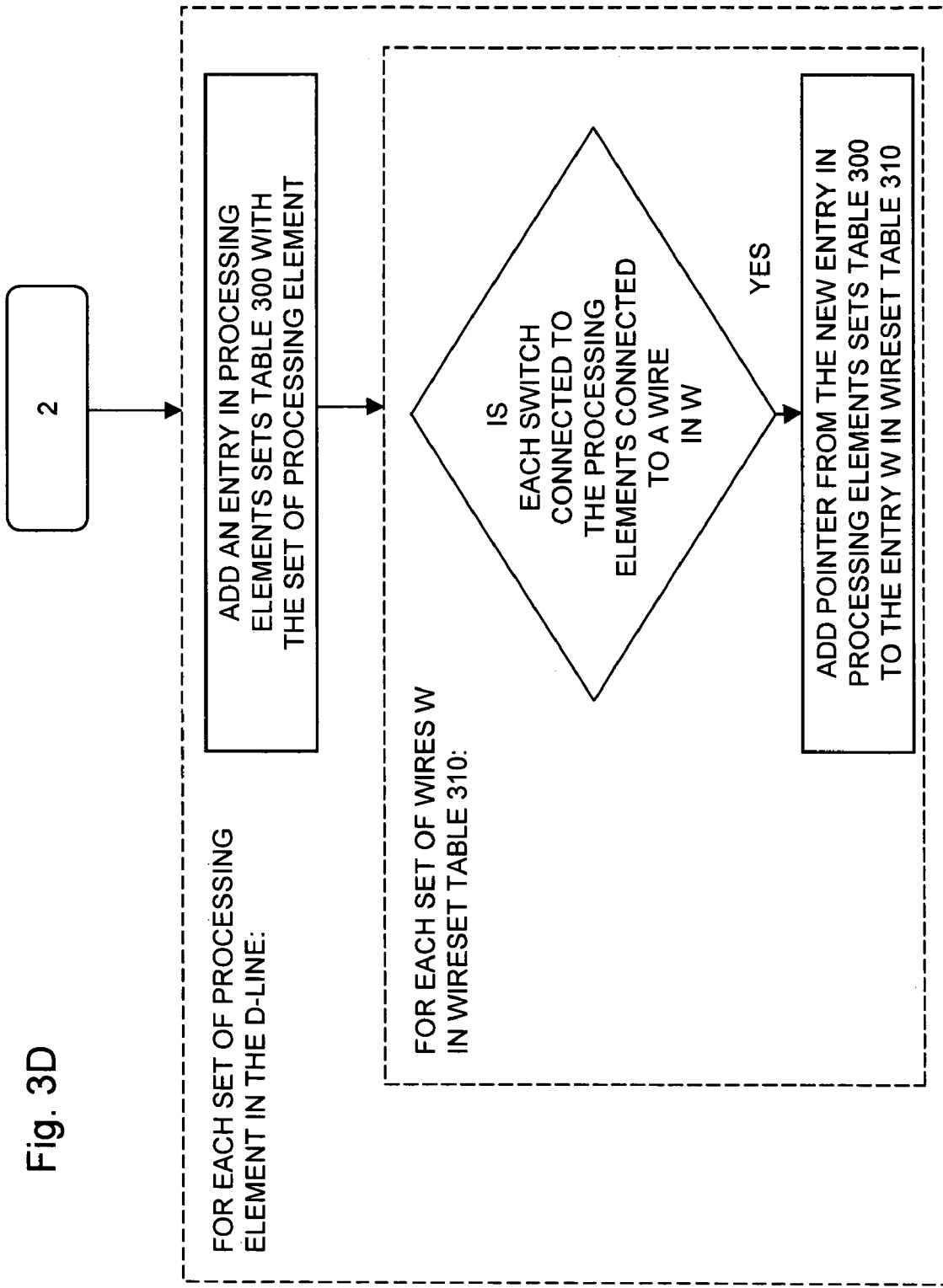
Figure 3E:
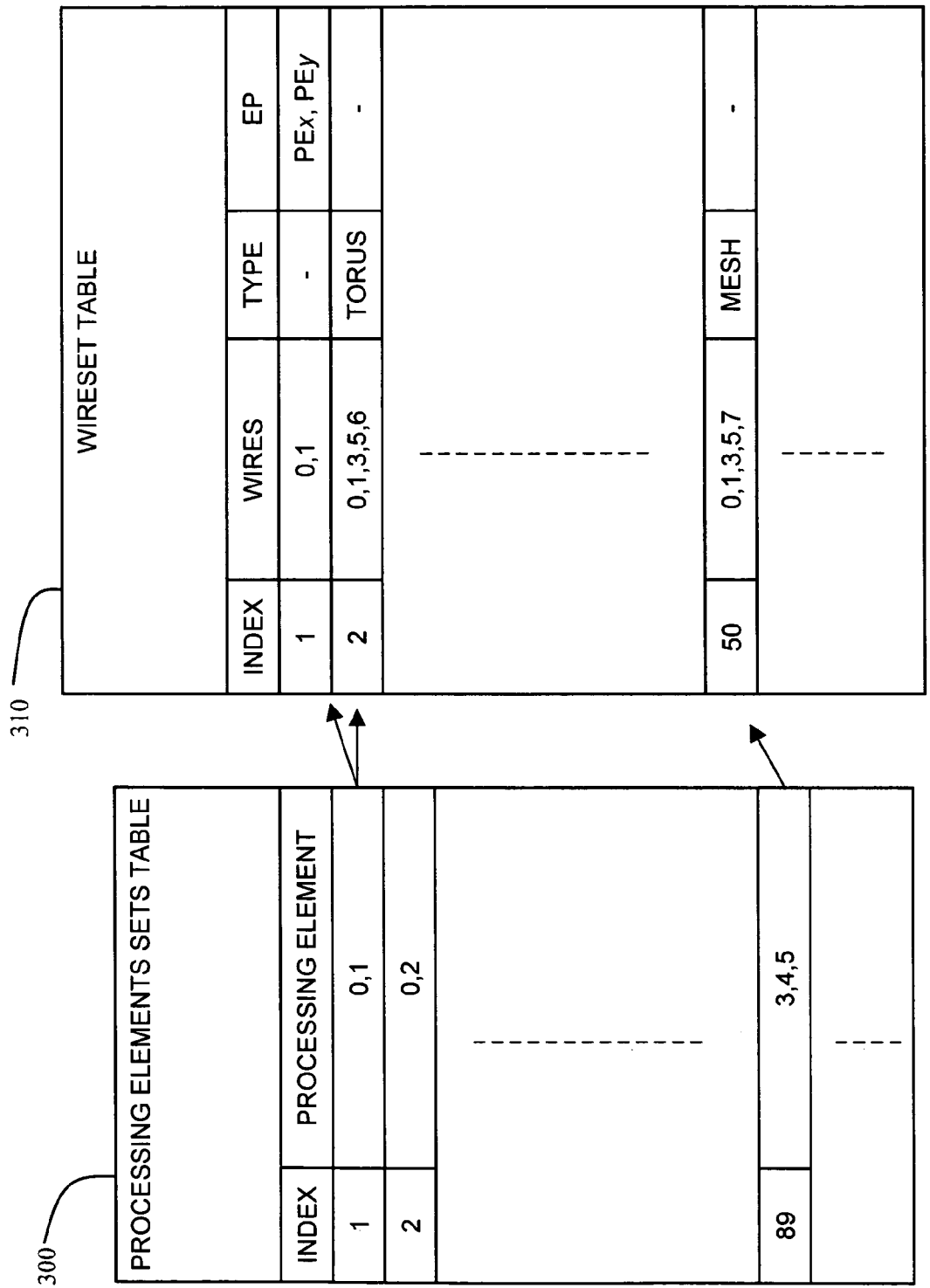
FIG. 3E, is a simplified block diagram of an exemplary lookup table, constructed in accordance with a preferred embodiment of the present invention.

Reference is now made to FIGS. 3A, 3B, 3C and 3D, which, taken together, is a simplified flow chart illustration of a method for creating a lookup table for allocating wires and configuring switches, operative in accordance with a preferred embodiment of the present invention, and to FIG. 3E, which is a simplified block diagram of an exemplary lookup table, constructed and operative in accordance with a preferred embodiment of the present invention.

In the method of FIG. 3A, multiprocessor computer 100 constructs a set of lookup tables, which includes a table 300 of sets of processing elements, and a wireset table 310, to facilitate the search of appropriate configurations of switches 120 and wires 130 for future job allocations. Where multiprocessor computer 100 has isomorphic D-lines, a single set of lookup tables is preferably constructed for each dimension in a particular D-line. Multiprocessor computer 100 preferably constructs the set of lookup tables 300 and 310 as follows:

1. Iterate over all possible sets of wires in the D-line.
    a. If a path cannot be traversed through the switches via the set of wires selected in the D-line for the current iteration, go to the next iteration
    b. For each switch that is connected to the set of wires in the current iteration:
        i. Count the number of wires that are connected to the switch.
        ii. If the number of wires is odd
            1. Mark the switch as 'odd'
            2. Mark which processing elements 110 connected to the switches 120 are end-points in wireset table 310, e.g. place processing element identifiers in column 'EP' c. If the wireset has no (zero) switches with odd degrees
   i. add the wireset to table 310
   ii. set the type of the entry in wireset table 310 to 'torus'
d. else, if it has two switches with odd degrees:
   i. add the wireset to table 310
   ii. set the type of the entry in wireset table 310 to 'mesh'
2. Iterate over all possible sets of processing elements 110 in the D-line
   a. Add an entry in table 300 with the set of processing elements 110.
   b. For each set 'W' of wires 130 in wireset table 310, if each switch that is connected to a processing element 110 in the entry is connected to a wire in 'W', update the entry in table 300 to point to the entry in wireset table 310 that contains 'W'.

Step 1 above may be accomplished by assigning each possible set of wires 130 a unique number and then scanning the entire range of numbers. For example, a set of wires 130 may be represented as a set of bits, where each wire 130 is represented by a unique bit, and where a bit is set to 'on' if the wire is in the set of wires 130 or 'off' otherwise. The number represented by the set of bits is the unique number assigned to that particular set of wires 130, and may be utilized to facilitate the search for set of wires 130 in the iterative process.

Figure 4:
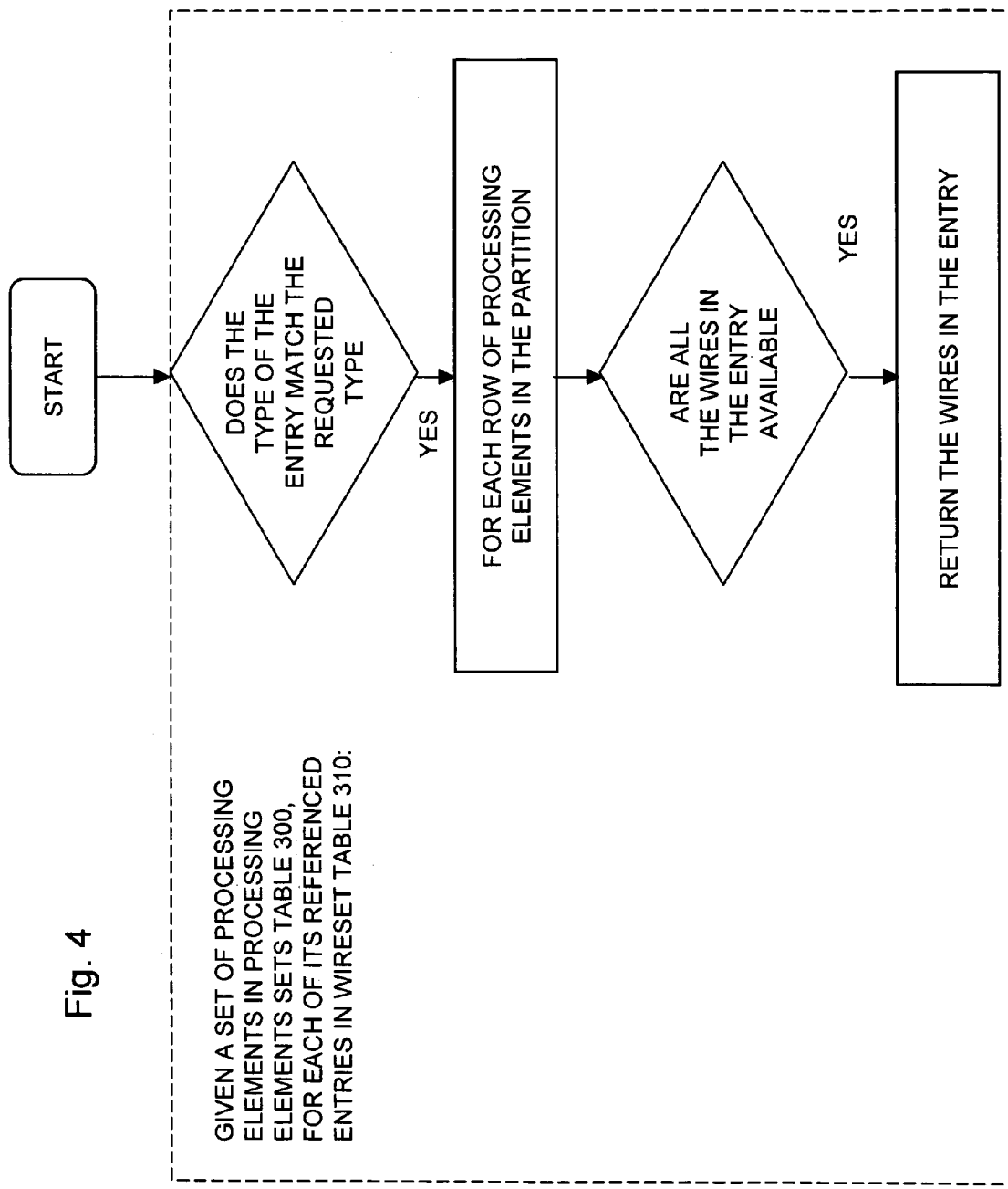
FIG. 4 is a simplified flow chart illustration of a method for searching a lookup table for allocating wires and configuring switches, operative in accordance with a preferred embodiment of the present invention.

Reference is now made to FIG. 4, which is a simplified flow chart illustration of a method for searching a lookup table for allocating wires and configuring switches, operative in accordance with a preferred embodiment of the present invention. In the method of FIG. 4 multiprocessor computer 100 searches a previously constructed lookup table, such as is described hereinabove in with reference to FIG. 3A. The search technique described hereinbelow is preferably employed where multiprocessor computer 100 chooses an isomorphic partition, as described hereinabove with reference to FIG. 1. For a given set of processing elements chosen by multiprocessor computer 100, multiprocessor computer 100 preferably performs the following search in each dimension to satisfy a request for the allocation of resources for a job:
1. Find the set of processing elements entry in table 300.
2. For each of its referenced entries in wireset table 310:
   a. If the entry in wireset table 310 is marked as a type 'torus' and the request is for a 'mesh' then go to step 2
   b. If the entry in wireset table 310 is marked as a type 'mesh' and the request is for a 'torus' then go to step 2
   c. If the entry in wireset table 310 is marked as a type 'mesh' and the request is for a 'mesh', but the end-point of the processing elements 110 does not match the requested end-point, then go to step 2
   d. For each row of processing elements 110 that participate in the partition, i.e. including the processing elements 110 in each of the isomorphic rows, if the wires in the entry in wireset table 310 are not all available, as determined by consulting the availability list described hereinabove, then go to step 2.
   e. Return the entry in wireset table 310
3. Return False, i.e. no set of wires can be found to match the requested configuration.

Figure 5A:
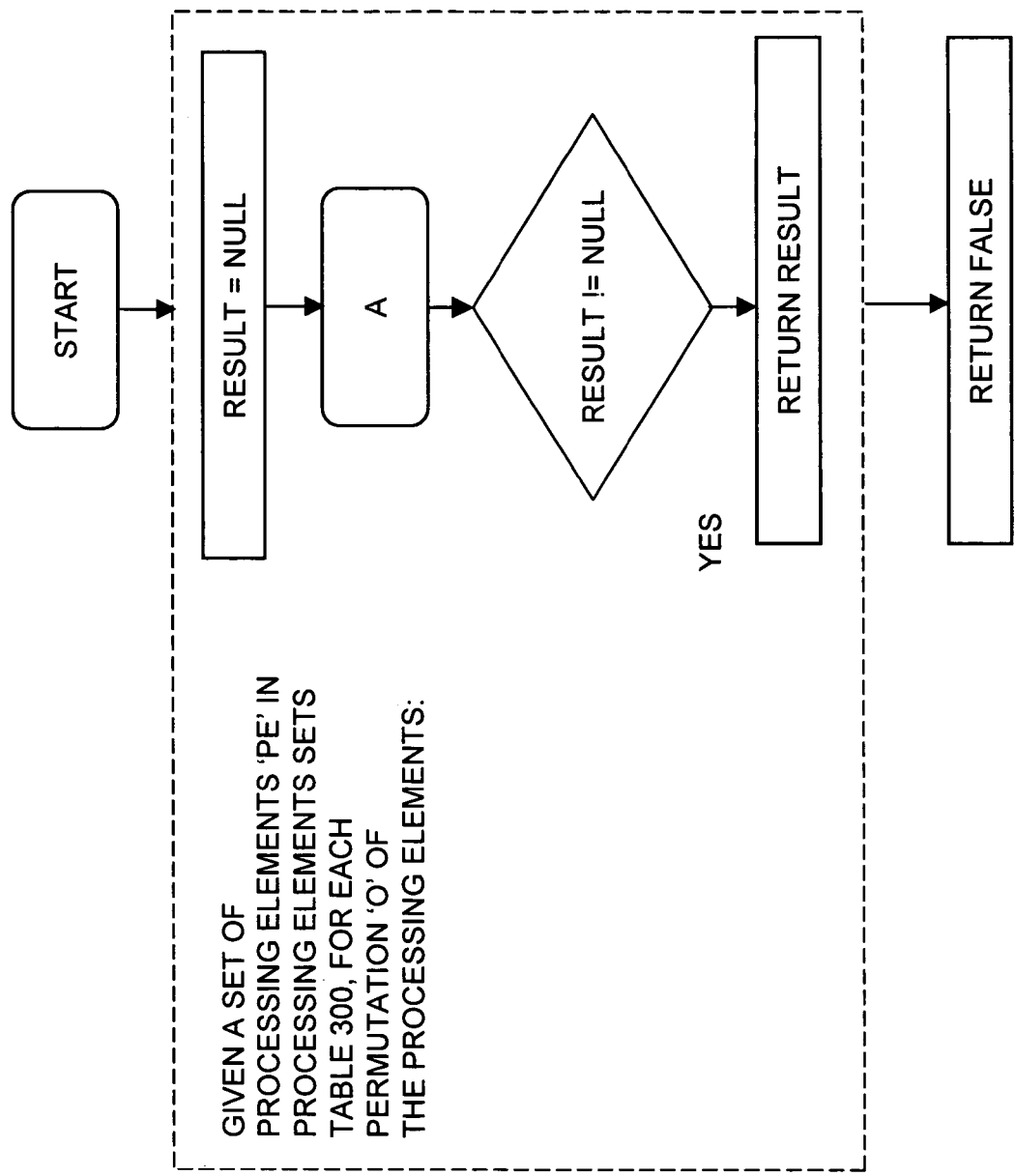
FIGS. 5A, 5B, and 5C, taken together, is a simplified flow chart illustration of a method for searching a lookup table for allocating wires and configuring switches among multiple isomorphic rows of processing elements with non-isomorphic wires, operative in accordance with a preferred embodiment of the present invention.
Figure 5B:
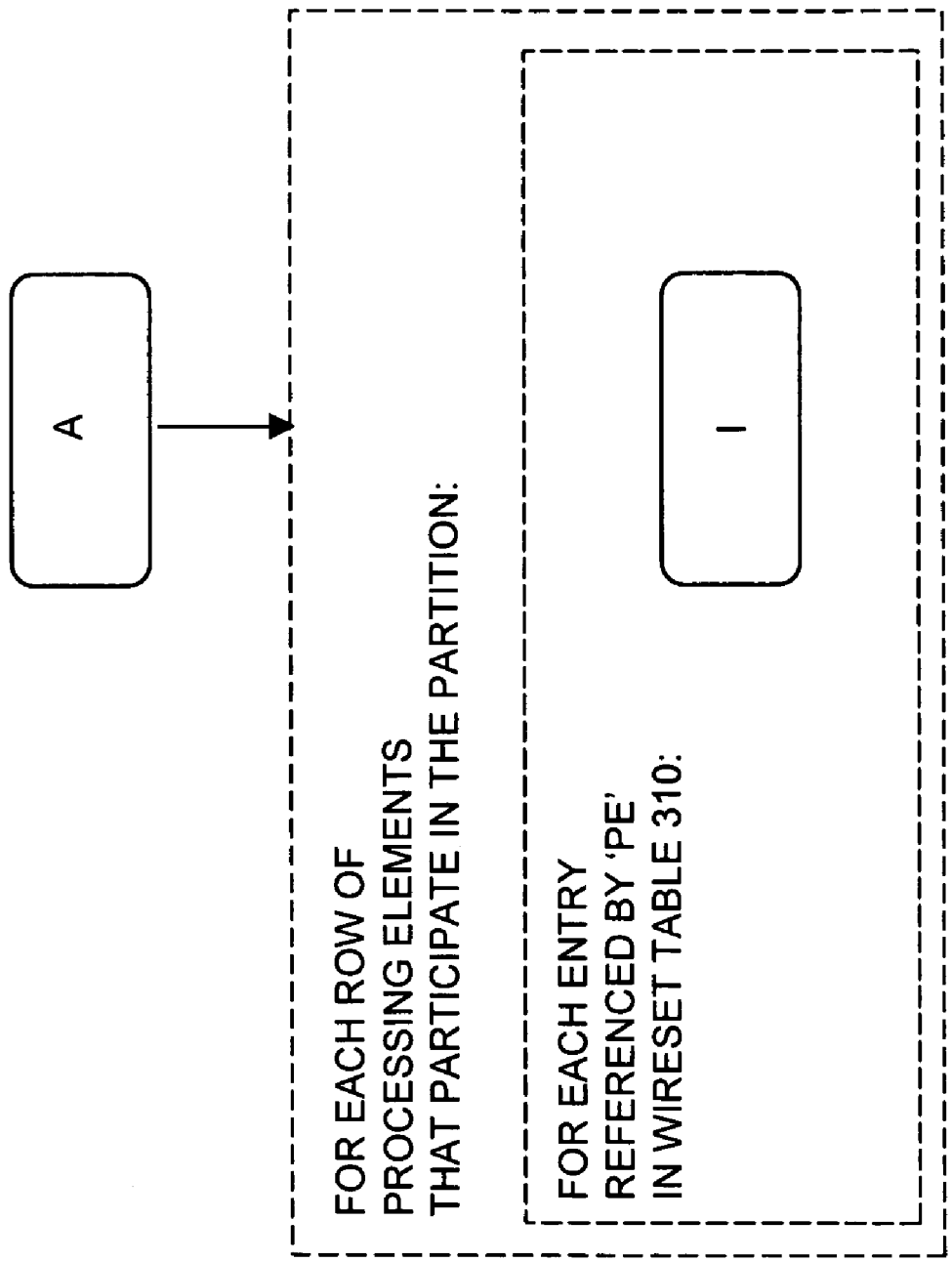
Figure 5C:
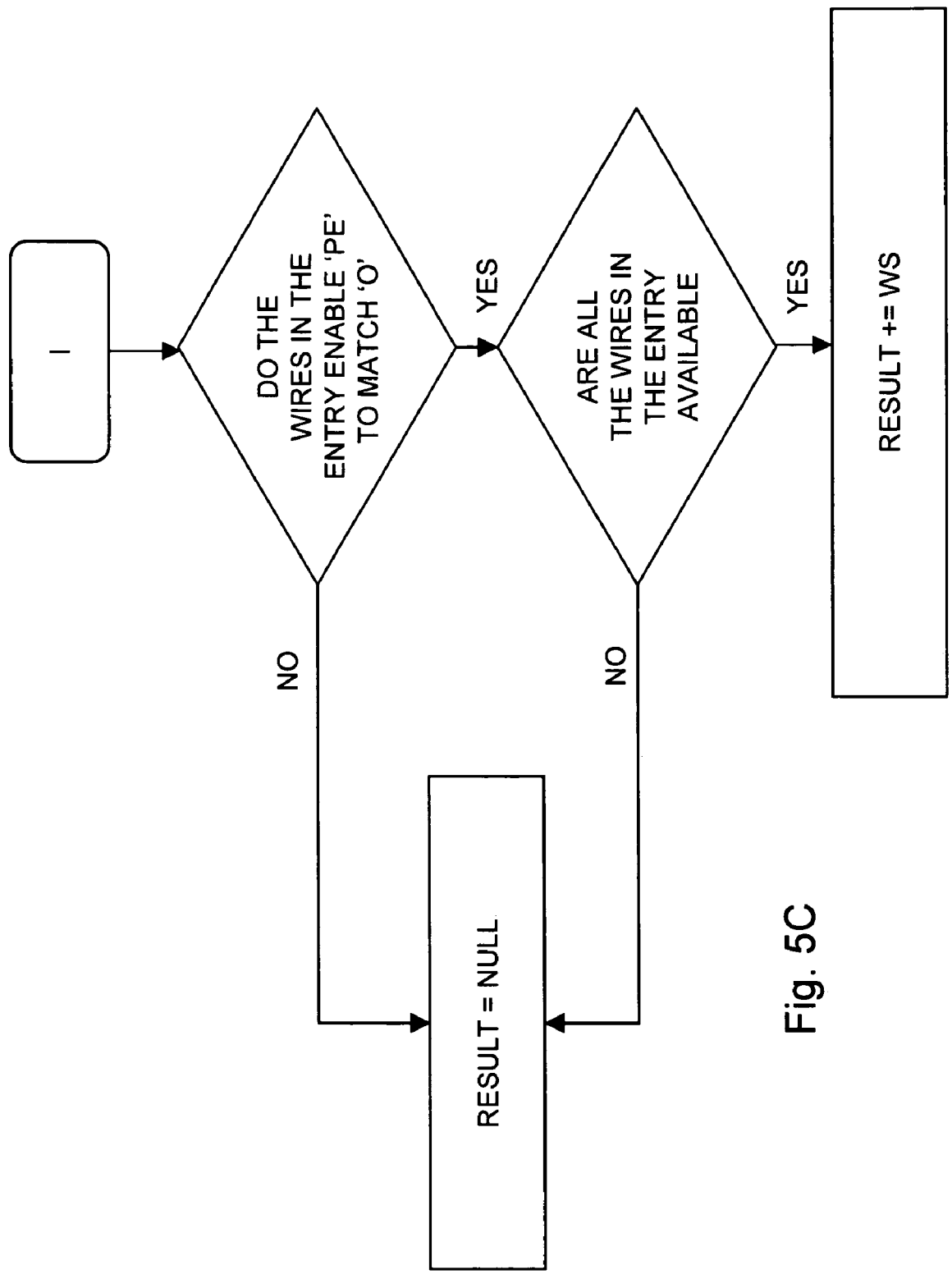

Reference is now made to FIGS. 5A, 5B, and 5C, which, taken together, is a simplified flow chart illustration of a method for searching a lookup table for allocating wires and configuring switches among multiple isomorphic rows of processing elements with non-isomorphic wires, operative in accordance with a preferred embodiment of the present invention. In the method of FIGS. 5A, 5B, and 5C, multiprocessor computer 100 searches a previously constructed lookup table, such as is described hereinabove in with reference to FIG. 3A, for a configuration where, unlike in the method of FIG. 4, in the method of FIGS. 5A, 5B, and 5C, multiprocessor computer 100 may choose different wires 130 for each D-line. In the method of FIGS. 5A, 5B, and 5C, for a given partition multiprocessor computer 100 preferably performs the following search for a configuration of switches to create a partition to satisfy a request for a job allocation, which includes a set PE of processing elements 110 that appears in the entry of table 300 that corresponds to the requested partition:

1. For each ordering/permutation, 'O', of the processing elements 110 in PE:
   A. For each row of processing elements that participate in the partition
      i. For each entry in wireset table 310 'WS' that corresponds to the requested processing elements 110 in PE.
         I. If the set of wires, 'WS', in the entry in wireset table 310 enables the ordering of PE to match 0:
            a. If all the wires in WS are available, as determined by consulting the availability list, then save WS for this row in RESULT.
            b. Go to A for next row
      ii. reset RESULT—no set of wires found to wire this row in order O
      iii. goto 1—try next order
   B. Return RESULT
2. Return false.—No order was found that can provide wires for all rows.

In order to determine if a wire set can connect processing elements in a specific order, such as is generally described in FIG. 5C, the methods of FIGS. 6 and 7 below may be employed.

Figure 6:
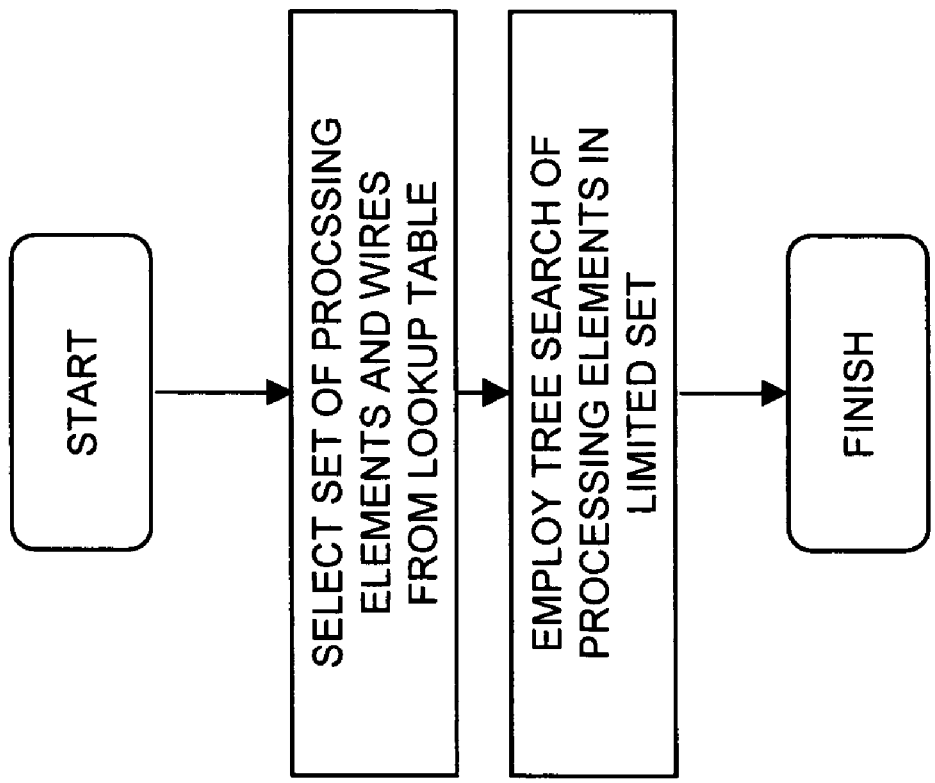
FIG. 6 is a simplified flow chart illustration of a hybrid search method for allocating wires and configuring switches, operative in accordance with a preferred embodiment of the present invention.

Reference is now made to FIG. 6, which is a simplified flow chart illustration of a hybrid search method for allocating wires and configuring switches, operative in accordance with a preferred embodiment of the present invention. In the method of FIG. 6 multiprocessor computer 100 preferably employs lookup tables, such as is described hereinabove in with reference to FIG. 3A, as a starting point in the tree traversal search, such as the search method described with reference to FIG. 2A, for the configuration of the switches 120. For example, given a request for a partition P with a unique ordering of processing elements 110, only the processing elements 110 found in table 300 corresponding to P and its respective entries in wireset table 310 will be searched with a depth-first tree traversal algorithm to determine if the corresponding switches 120 can be configured to satisfy the requested ordering by multiprocessor 100.

Figure 7:
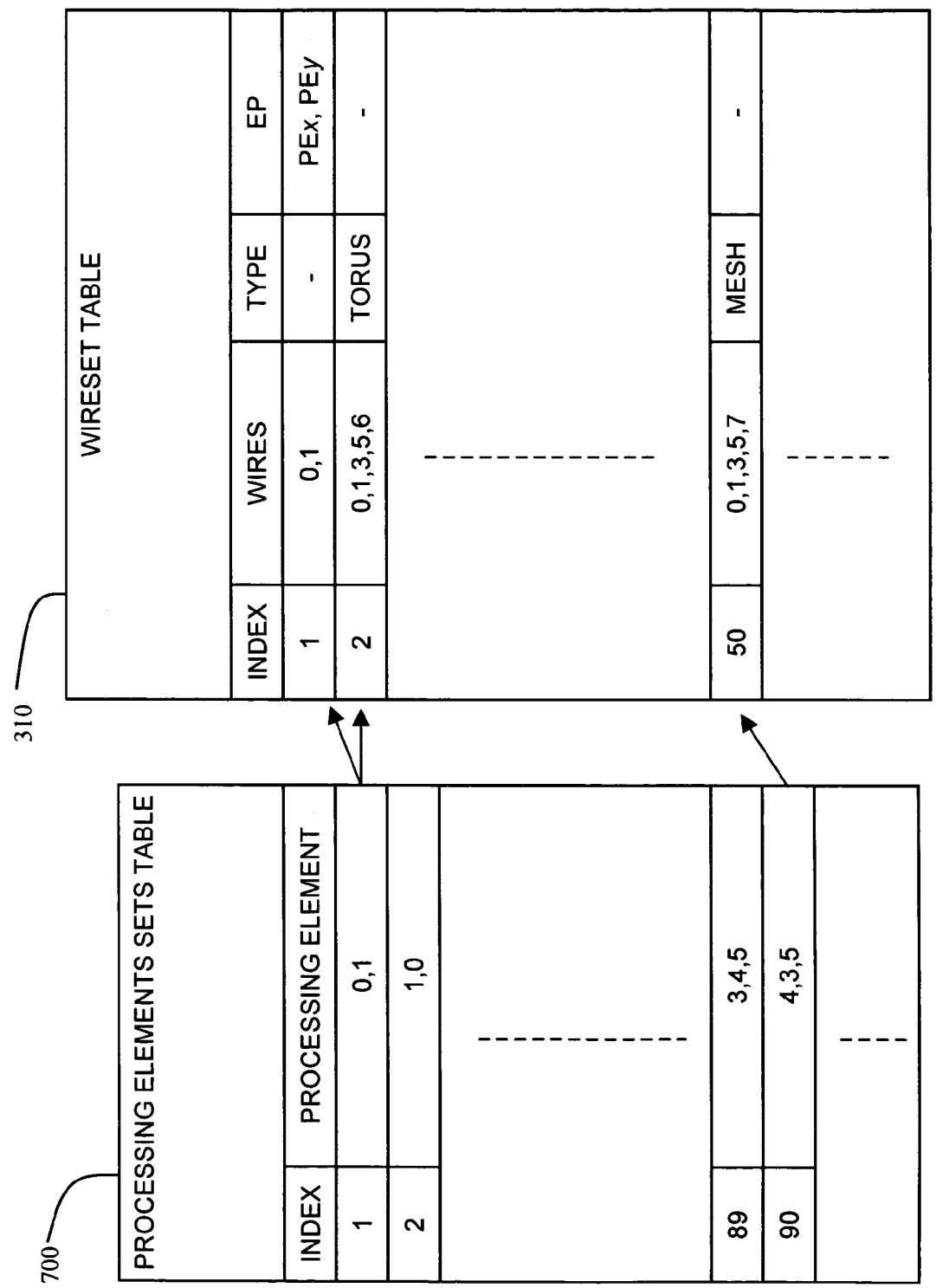
FIG. 7 is a simplified block diagram of an exemplary extended lookup table, constructed in accordance with a preferred embodiment of the present invention.

Reference is now made to FIG. 7, which is a simplified block diagram of an exemplary extended lookup table, constructed in accordance with a preferred embodiment of the present invention. In FIG. 7, lookup tables are constructed and searched in fundamentally the same manner as described hereinabove with reference to FIGS. 3A, 3B, 4 and 5, with the exception that extended information is inserted into the tables to increase the speed of the search. The extended information preferably includes all possible orderings of processing elements 110 for each set of processing elements. For example, the processing elements 3,4,5 that appear once in table 300 will appear six times in a table 700 of sets of processing elements as entries. {3,4,5}, {3,5,4}, {4,3,5}, {4,5,3}, {5,3,4} and {5,4,3}.

The lookup table may further be sorted based on the number of wires within an entry. For example, in FIG. 7 the entry in wireset table 310 indexed '1' contains a reference to 2 wires and hence precedes the entry indexed '2' that contains a reference to 5 wires.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for creating a lookup table for allocating wires and configuring switches in a multiprocessor computer, the method comprising:

selecting a set of at least two wires in a D-line selected from a plurality of possible sets of wires in said D-line;

determining a traversable path through a plurality of switches via said selected set of wires;

for each switch that is connected to said set of wires, recording said set of wires in one record of a wireset table including either of a topology indicator or an endpoint disposition of said set of wires;

selecting a plurality of sets of processing elements in said D-line selected from a plurality of possible sets of processing elements in said D-line, wherein each of said sets of processing elements includes at least two processing elements;

recording each of said selected sets of processing elements in separate records of a table of processing element sets; and associating any entries in said wireset table with any entries in said table of processing element sets where each switch that is connected to a processing element in an entry in said table of processing element sets is connected to a wire in an entry of said wherein said recording said set of wires step comprises:

for each switch that is connected to said set of wires:
      if the number of wires connected to said switch is odd:
         marking said switch as 'odd';
         marking any processing elements that are connected to said switches as 'end-points' in said wireset table;

if no switch that is connected to said set of wires is connected to an odd number of wires:
      adding said set of wires to said wireset table;
      marking said wireset table entry as 'torus'; and if two switches that are connected to said set of wires are connected to an odd number of wires:
      adding said set of wires to said wireset table; and
      marking said wireset table entry as 'mesh'.

\* \* \* \* \*